United States Patent
Bai et al.

(10) Patent No.: US 11,965,085 B2
(45) Date of Patent: Apr. 23, 2024

(54) ETHYLENE PROPYLENE COPOLYMER COMPOUNDS FOR USE IN LAYERED ARTICLES

(71) Applicant: ExxonMobil Chemical Patents Inc., Baytown, TX (US)

(72) Inventors: Zhifeng Bai, Houston, TX (US); Scott H. Loyd, League City, TX (US); Narayanaswami Dharmarajan, Houston, TX (US); Rainer Kolb, Kingwood, TX (US); David W. Abmayr, Jr., Houston, TX (US); Khodabakhsh Irani, Houston, TX (US)

(73) Assignee: ExxonMobil Engineering & Technology Company, Baytown, TX (US)

( * ) Notice: Subject to any disclaimer, the term of this patent is extended or adjusted under 35 U.S.C. 154(b) by 105 days.

(21) Appl. No.: 17/419,039

(22) PCT Filed: Jan. 10, 2020

(86) PCT No.: PCT/US2020/013074
§ 371 (c)(1),
(2) Date: Jun. 28, 2021

(87) PCT Pub. No.: WO2020/150090
PCT Pub. Date: Jul. 23, 2020

(65) Prior Publication Data
US 2022/0119633 A1 Apr. 21, 2022

Related U.S. Application Data

(60) Provisional application No. 62/791,923, filed on Jan. 14, 2019.

(51) Int. Cl.
| | |
|---|---|
| *C08L 23/16* | (2006.01) |
| *B32B 1/08* | (2006.01) |
| *B32B 25/04* | (2006.01) |
| *B32B 25/14* | (2006.01) |
| *F16G 5/22* | (2006.01) |

(52) U.S. Cl.
CPC ............ *C08L 23/16* (2013.01); *B32B 1/08* (2013.01); *B32B 25/042* (2013.01); *B32B 25/14* (2013.01); *B32B 2270/00* (2013.01); *B32B 2413/00* (2013.01); *B32B 2419/06* (2013.01); *B32B 2597/00* (2013.01); *C08L 2201/08* (2013.01); *C08L 2205/025* (2013.01); *C08L 2205/03* (2013.01); *C08L 2207/322* (2013.01); *F16G 5/22* (2013.01)

(58) Field of Classification Search
CPC ................ C08L 23/16; C08L 2201/08; C08L 2205/025; C08L 2205/03; C08L 2207/322; B32B 1/08; B32B 25/042; B32B 25/14; B32B 2270/00; B32B 2413/00; B32B 2419/06; B32B 2597/00; F16G 5/22

See application file for complete search history.

(56) References Cited

U.S. PATENT DOCUMENTS

| | | |
|---|---|---|
| 5,569,716 A | 10/1996 | Okamoto et al. |
| 5,571,868 A | 11/1996 | Datta et al. |
| 5,654,370 A | 8/1997 | Datta et al. |
| 7,199,189 B2 | 4/2007 | Ravishankar et al. |
| 7,615,589 B2 | 11/2009 | Westwood et al. |
| 2013/0150488 A1 | 6/2013 | Feng |
| 2021/0047505 A1 | 2/2021 | Loyd et al. |
| 2021/0102052 A1 | 4/2021 | Dharmarajan et al. |

FOREIGN PATENT DOCUMENTS

| | | |
|---|---|---|
| WO | 2004/055083 | 7/2004 |
| WO | 2019/112728 | 6/2019 |

OTHER PUBLICATIONS

J. R. Beatty, "Tel-Tak: A Mechanical Method for Estimating Both Tackiness and Stickiness of Rubber Compounds", Rubber Chem and Tech, vol. 42, Issue 4, pp. 1040-1053 (1969).
G. R. Hamed, "Tack and Green Strength of Elastomeric Materials", vol. 54, Issue 3, pp. 576-595 (1981).

*Primary Examiner* — Michael C Miggins

(57) ABSTRACT

A multilayer structure can include at least one layer that comprises an ethylene propylene diene copolymer compound that comprises: 60 parts per hundred rubber (phr) to 95 phr of a first ethylene propylene diene copolymer (EP (D)M) having an ethylene content of 62 wt % to 90 wt % based on the first EP(D)M and a heat of fusion ($H_f$) of 15 J/g or greater; 5 phr to 40 phr of an second EP(D)M having an ethylene content of 40 wt % to 60 wt % based on the second EP(D)M and a $H_f$ of 0 J/g to 14 J/g, wherein the $H_f$ of the first EP(D)M minus the $H_f$ of the second EP(D)M is 5 J/g or greater; wherein the first EP(D)M and second EP(D)M combined are 100 parts; a filler at 40 phr to 500 phr; and a curing agent at 0.5 phr to 20 phr.

20 Claims, No Drawings

ETHYLENE PROPYLENE COPOLYMER COMPOUNDS FOR USE IN LAYERED ARTICLES

CROSS-REFERENCE TO RELATED APPLICATIONS

This application is a U.S. national phase application of PCT Application No. PCT/US2020/013074 having a filing date of Jan. 10, 2020, which claims priority to and the benefit of U.S. Provisional Application Ser. No. 62/791,923 having a filing date of Jan. 14, 2019, the contents of each of which are incorporated by reference in their entirety.

FIELD

The present disclosure relates to ethylene propylene diene copolymer compounds for use in layered articles.

BACKGROUND

Natural and synthetic rubbers and elastomers are used extensively in the production of multi-layer articles such as V-belts, hoses, and sheets for roofing, mats, and tires. Examples of materials that are used include polychloroprene, natural rubbers, and synthetic rubbers such as neoprene, butyl rubber, styrene butadiene rubbers, and polydiene rubbers. Typically, the rubber compounds are produced by mixing to thoroughly disperse additives such as fillers, pigments, antioxidants, and vulcanizing agents throughout the rubber. Once the compound is formed, the final articles are produced by forming layers, laying up, and vulcanizing or by co-extruding and subsequent vulcanizing. Typical, manufacturing processes for V-belts comprise producing laminated strips of the belting material, usually a laminar structure, laying the strips around a drum, and then vulcanizing. It is therefore important that the layers in the laminar structure have sufficient building tack (or rubber-to-rubber tack) to adhere to each other and to firmly bond the two ends of the strips together.

Polychloroprenes are often used in these articles because the presence of the chlorine in polymer backbone imparts sufficient tack prior to vulcanization. The presence of chlorine is, however, undesirable from an environmental point of view, and the unsaturation in the polymer backbone leads to poor aging of the rubber.

Ethylene copolymer or terpolymer elastomers are attractive materials for the production of articles such as V-belts, hoses, and mats due to their combined thermal and ozone stability, barrier, elastomeric, and resilience properties. They do not however have sufficient building tack to enable the formation of a sufficient bond to form an integral structure with the other layers prior to vulcanization, which limits their use in the applications.

It has been proposed in European Patent Application 0685521, that hydrogenated petroleum resins may be incorporated into hydrocarbon rubbers such as ethylene propylene copolymer rubber, ethylene propylene diene copolymer rubber, natural rubber, isoprene rubber, styrene butadiene copolymer rubber, and butadiene rubber, to enhance processing and adhesion. The rubber is said to have insufficient adhesion and an excessively high viscosity to wrap around the roll during processing. European Patent Application 0685521 sets out to overcome the problem that although tackifiers can improve processability, they adversely affect the vulcanizate in physical properties and heat resistance, the problem is said to be overcome by the use of hydrogenated petroleum resins.

Accordingly, European Patent Application 0685521 is not concerned with building tack but with rubber processing and adhesion and the properties of vulcanizates. The present invention on the other hand is concerned with the development of building tack of rubber with retained physical properties and heat resistance using polymer blends.

SUMMARY OF THE INVENTION

The present disclosure relates to ethylene propylene diene copolymer EP(D)M compounds for use in layered articles with improved building tack while not compromising green strength.

In a first embodiment, an article (e.g., a belt, a tube, a hose, or a roof sheeting) can comprise a multilayer structure with at least one layer comprising an ethylene propylene diene copolymer compound that comprises: 60 parts per hundred rubber (phr) to 95 phr of a first ethylene propylene diene copolymer having an ethylene content of 62 wt % to 90 wt % based on the first ethylene propylene diene copolymer and a heat of fusion ($H_f$) of 15 J/g or greater; 5 phr to 40 phr of an second ethylene propylene diene copolymer having an ethylene content of 40 wt % to 60 wt % based on the second ethylene propylene diene copolymer and a $H_f$ of 0 J/g to 14 J/g, wherein the $H_f$ of the first ethylene propylene diene copolymer minus the $H_f$ of the second ethylene propylene diene copolymer is 5 J/g or greater; wherein the first ethylene propylene diene copolymer and second ethylene propylene diene copolymer combined are 100 parts; a filler at 40 phr to 500 phr; and a curing agent at 0.5 phr to 20 phr.

In a second embodiment, a method can comprise forming an ethylene propylene diene copolymer compound comprising: 60 parts per hundred rubber (phr) to 95 phr of a first ethylene propylene diene copolymer having an ethylene content of 62 wt % to 90 wt % based on the first ethylene propylene diene copolymer and a $H_f$ of 15 J/g or greater; 5 phr to 40 phr of an second ethylene propylene diene copolymer having an ethylene content of 40 wt % to 60 wt % based on the second ethylene propylene diene copolymer and a $H_f$ of 0 J/g to 14 J/g, wherein the $H_f$ of the first ethylene propylene diene copolymer minus the $H_f$ of the second ethylene propylene diene copolymer is 5 J/g or greater; a filler at 40 phr to 100 phr; and a curing agent at 0.5 phr to 20 phr; forming a multilayer structure comprising at least one layer comprising the ethylene propylene diene copolymer compound; and vulcanizing the multilayer structure.

In either embodiment, the ethylene propylene diene copolymer compound can have at least one of the following three properties: (i) greater than 20% increase in a building tack without aging as compared to a control compound that is identical to the ethylene propylene diene copolymer compound except 0 phr of the second ethylene propylene diene copolymer and 100 phr of the first ethylene propylene diene copolymer, (ii) greater than 50% retention in a building tack with aging at ambient condition for 1 month, and (iii) not more than 30% decrease in a green strength as compared to the control compound.

In any foregoing embodiment, the first ethylene propylene diene copolymer can comprise units derived from ethylene, propylene, and a diene, wherein a diene content is 0.1 wt % to 6 wt % based on the first ethylene propylene diene copolymer.

In any foregoing embodiment, the second ethylene propylene diene copolymer can comprise units derived from ethylene, propylene, and a diene, wherein a diene content is 0.1 wt % to 6 wt % based on the second ethylene propylene diene copolymer.

In any foregoing embodiment, the ethylene propylene diene copolymer compound can be absent processing oil or further comprises 0.1 phr to 30 phr processing oil.

In any foregoing embodiment, the ethylene propylene diene copolymer compound can further comprise an antioxidant at 0.1 phr to 20 phr.

In any foregoing embodiment, the ethylene propylene diene copolymer compound can further comprise a softener at 0.1 phr to 20 phr.

In any foregoing embodiment, the multilayer structure can be absent an adhesive adjacent to the at least one layer comprising the ethylene propylene diene copolymer compound.

DETAILED DESCRIPTION

The present disclosure relates to ethylene propylene diene copolymer compounds for use in layered articles. More specifically, the ethylene propylene diene copolymer (EP(D)M) compounds of the present invention have improved building tack while not compromising green strength, which improves the production of belts like V-belts. Further, the EP(D)M compounds of the present invention retain building tack over time, which improves handling and allows for longer storage of layered articles produced therewith.

The EP(D)M compounds described herein comprise 60 parts per hundred rubber (phr) to 95 phr of a first EP(D)M having an ethylene content of 62 wt % to 90 wt % based on the first EP(D)M and a heat of fusion ($H_f$) of 15 J/g or greater; and 5 phr to 40 phr of an second EP(D)M having an ethylene content of 40 wt % to 60 wt % based on the second EP(D)M and a $H_f$ of 0 J/g to 14 J/g, wherein the $H_f$ for the first EP(D)M minus the $H_f$ for the second EP(D)M is 5 J/g or more. As used herein, the rubber of phr is a combination of the first ethylene propylene diene copolymer and the second ethylene propylene diene copolymer, and the parts are based on weight. The ethylene propylene diene copolymer compounds described herein comprise a total of 100 parts of the first ethylene propylene diene copolymer and the second ethylene propylene diene copolymer combined.

Without being limited by theory, the first EP(D)M can generally be described as a semicrystalline EP(D)M and the second EP(D)M as an amorphous EP(D)M. It is believed that the difference in crystallinity between the first EP(D)M and the second EP(D)M allows for the second EP(D)M to impart tack to the EP(D)M compound without sacrificing the green strength the first EP(D)M provides. Improved tack allows for layers formed of the ethylene propylene diene copolymer compounds to adhere better to abutting layers. Accordingly, the resultant layered product before vulcanization has a longer storage life because the building tack is maintained for longer periods of time with the compounds of the present invention.

Test Methods

As used herein, the ethylene content of the EP(D)M is determined by ASTM D3900-17 and is not corrected for diene content.

As used herein, the diene content is determined using FTIR according to ASTM D6047-17.

As used herein, Mooney viscosity (ML) can be determined by ASTM D1646-17 ((1+4), 125° C., 2 s$^{-1}$ shear rate).

As used herein, heat of fusion ($H_f$) can be determined measured using differential scanning calorimetry (DSC) using commercially available equipment such as a Perkin Elmer Pyris 1 Thermal Analysis System. Typically, 10 mg to 15 mg of the sample, that has been stored at room temperature for at least 48 hours, is sealed in an aluminum pan and loaded into the instrument at room temperature. The sample is equilibrated at 25° C. for 5 minutes, cooled to −70° C. and equilibrated at −70° C. for 5 minutes, then heated at a heating rate of 10° C./min to 170° C., followed by an equilibration at 170° C. for 5 minutes, and cooled at 10° C./min to −70° C., followed by an equilibration at −70° C. for 5 minutes, and then heated at a heating rate of 10° C./min to 170° C. Areas under the DSC curve of the second heat cycle are used to determine the $H_f$ upon melting, which can be used to calculate the degree of crystallinity (also called the percent crystallinity).

As used herein, the term "$\Delta H_f$" refers to the $H_f$ of the first EP(D)M minus the $H_f$ of the second EP(D)M.

As used herein percentage of crystallinity (% crystallinity) is determined by using the same DSC method for determining $H_f$, where the % crystallinity is the heat of fusion for the sample (either the first or the second EP(D)M) divided by the heat of fusion for 100% crystalline polyethylene, which has the value of 293 J/g (B. Wunderlich, Thermal Analysis, Academic Press, 1990, pp. 417-431.), times 100 to report the value as a percentage.

First Ethylene Propylene Diene Copolymer (Major Component)

The major component first ethylene propylene diene copolymer (EP(D)M) comprises ethylene-derived monomers, propylene-derived monomers, and optionally diene-derived monomers. The first EP(D)M has an ethylene content of 62 wt % to 90 wt %, or 62 wt % to 80 wt %, or 62 wt % to 70 wt %, or 70 wt % to 90 wt %, or 80 wt % to 90 wt % based on the first EP(D)M with the balance being propylene and, optionally, a diene. When a diene is included, the diene is present in the first EP(D)M at 0.1 wt % to 6 wt %, or 1 wt % to 3 wt %, or 3 wt % to 6 wt % or 0.1 wt % to 2 wt % based on the first EP(D)M. With or without the diene, the balance of the first EP(D)M compounds is preferably propylene.

The first EP(D)M may have a Mooney viscosity ML (1+4) at 125° C., as determined according to ASTM D1646-17, of 20 MU or greater (e.g., 20 MU to 100 MU), or 38 MU to 50 MU, or 40 MU to 60 MU, or 50 MU to 70 MU, or 60 MU to 80 MU, or 70 MU to 90 MU, or 80 to 100 MU. Relative to Mooney viscosity, the values "MH" and "ML" used here and throughout the description refer to "maximum torque" and "minimum torque," respectively.

The first EP(D)M may have a heat of fusion ($H_f$) determined by the DSC procedure described herein, which is 15 J/g or greater (e.g., 15 J/g to 80 J/g), or 15 J/g to 45 J/g, or 35 J/g to 70 J/g, or 50 J/g to 80 J/g.

The crystallinity of the first EP(D)M may be expressed in terms of percentage of crystallinity (i.e., % crystallinity), as determined according to the DSC procedure described herein. The first EP(D)M may have a % crystallinity of 5% to 28%, or 5% to 20%, or 10% to 20%, or 15% to 25%.

The EP(D)M compounds can include cumulatively 60 phr to 95 phr, or 75 phr to 95 phr, or 60 phr to 80 phr of one or more first EP(D)M.

Second Ethylene Propylene Diene Copolymer (Minor Component)

The minor component second ethylene diene propylene (EP(D)M) copolymer has an ethylene content of 40 wt % to 60 wt %, or 40 wt % to 50 wt %, or 50 wt % to 60 wt % based on the second EP(D)M. The balance of the second EP(D)M can comprise propylene and, optionally, a diene. When a diene is included, the diene is present in the second EP(D)M at 0.1 wt % to 6 wt %, or 1 wt % to 3 wt %, or 3 wt % to 6 wt % or 0.1 wt % to 2 wt % based on the second EP(D)M. With or without the diene, the balance of the second EP(D)M is preferably propylene.

Examples of dienes include, but are not limited to, 1-butene, 1-hexene, 4-methyl-1-pentene and/or 1-octene. In one or more embodiments, the diene comonomer units may derive from 5-ethylidene-2-norbornene (ENB), 5-vinyl-2-norbornene, divinyl benzene, 1,4-hexadiene, 5-methylene-2-norbornene, 1,6-octadiene, 5-methyl-1,4-hexadiene, 3,7-dimethyl-1,6-octadiene, 1,3-cyclopentadiene, 1,4-cyclohexadiene, dicyclopentadiene, or a combination thereof.

The second EP(D)M may have a Mooney viscosity ML (1+4) at 125° C., as determined according to ASTM D1646-17, of 20 MU or greater (e.g., 20 MU to 100 MU), or 38 MU to 50 MU, or 40 MU to 60 MU, or 50 MU to 70 MU, or 60 MU to 80 MU, or 70 MU to 90 MU, or 80 MU to 100 MU.

The second EP(D)M may have $H_f$ determined by the DSC procedure described herein, which is 14 J/g or less (e.g., 0 J/g to 14 J/g), or 1 J/g to 10 J/g, or 2 J/g to 8 J/g, or 3 J/g to 7 J/g.

The second EP(D)M may have a % crystallinity of less than 5% (e.g., 0% to 4.9%), or 1% to 4%, or 1% to 3%, or 0% to 2%. Using the same DSC method for determining heat of fusion, the % crystallinity can be determined.

The EP(D)M compounds can include cumulatively 5 phr to 40 phr, or 5 phr to 25 phr, or 20 phr to 40 phr of one or more second EP(D)M.

Curing Agent

The curing agent can be a peroxide cure system or a sulfur cure system.

Peroxide cure systems can include one or more peroxide compound, preferably one or more organic peroxide compound. Peroxide cross-linking is possible without the presence of unsaturated moieties in the polymer backbone but can be accelerated by the presence of such moieties. Useful organic peroxides include, but are not limited to, diaryl peroxides, ketone peroxides, peroxydicarbonates, peroxyesters, dialkyl peroxides, hydroperoxides, benzoyl peroxides, lauroyl peroxides, di-t-butyl peroxide, dicumyl peroxide, t-butylcumyl peroxide, t-butyl peroctoate, p-di(t-butylperoxy)diisopropylbenzene, 2,5-dimethyl-2,5-di(t-butylperoxy)hexane, 1,1-di(t-butylperoxy)-3,3,5-trimethylcyclohexane, 2,5-dimethyl-2,5-di(t-butylperoxy)hexene-3, t-butyl-peroxy-(cis-3-carboxy)propenoate, 1,1-di(t-amylperoxy)cyclohexane, t-amyl-(2-ethylhexyl)peroxycarbonate, t-butylperoxy-3,5,5-trimethylhexanoate, t-butyl peroxybenzoate, and the like, and mixtures thereof.

Examples of commercially available curing agents include, but are not limited to, LUPEROX® from Arkema, TRIGONOX® and PERKADOX® from Akzo Nobel, and VAROX® from R.T. Vanderbilt, either as a liquid product or as a concentrated assay on an inorganic support.

Sulfur cure systems can include sulfur and a sulfur donor. Examples of sulfur donors include, but are not limited to, tetramethylthiuram disulfide (TMTD), and dipentamethylenethiuram tetrasulfide (DPTT), 2-mercaptobenzthiazole (MBT), 2,2'-benzothiazyl disulfide (MBTS), and the like, and mixtures thereof.

The EP(D)M compounds can include cumulatively 0.5 phr to 20 phr, or 0.5 phr to 10 phr, or 5 phr to 15 phr, or 10 phr to 20 phr of one or more curing agents.

Additives

Antioxidants can also be included in the EP(D)M compounds. Examples of antioxidants include, but are not limited to, antioxidants of naphthylamine type, diphenylamine type, p-phenylenediamine type, quinoline type, hydroquinone derivative, monophenol type, bis-, tris-, polyphenol type, thiobis-phenol type, hindered phenol type, phosphite ester type, thiodipropionate type, benzimidazole type, nickel dithiocarbonate type, thiourea type, triazole type, and wax; and UV absorber and photostabilizer, such as those of salicylic acid derivatives, benzophenone type, benzotriazole type, oxalanilide derivatives, hydroxybenzoate type, hindered amine type, and any combination thereof. The EP(D)M compounds can include cumulatively 0.1 phr to 20 phr, or 1 phr to 5 phr, or 5 phr to 15 phr, or 10 phr to 20 phr of one or more antioxidants.

Softeners can also be included in the EP(D)M compounds. Examples of softeners include, but are not limited to, petroleum oil (processing oil), ethylene-α-olefin oligomer, paraffin wax, liquid paraffin, white oil, petrolatum, petroleum, sultanate, gilsonite, asphalt, diene oligomer (including hydrogenated one), vegetable oil softener (castor oil, cotton seed oil, rapeseed oil, palm oil, peanut oil, pine oil, tall oil, and the like), rubber substitute (vulcanized oil), fatty acid, fatty acid salt, fatty acid ester, and any combination thereof. The EP(D)M compounds can include cumulatively 0.1 phr to 20 phr, or 1 phr to 5 phr, or 5 phr to 15 phr, or 10 phr to 20 phr of one or more softeners. Alternatively, the EP(D)M compounds can be absent a softener (e.g., absent a processing oil).

Fillers can also be included in the EP(D)M compounds. Examples of fillers include, but are not limited to, carbon black (channel black, furnace black, thermal black or lamp black, acetylene black, and the like), silica (white carbon, and the like), basic magnesium carbonate, calcium carbonate (e.g., light calcium carbonate, ground calcium carbonate, and surface-treated calcium carbonate), magnesium silicate (e.g., ultrafine magnesium silicate), clay, talc, zinc oxide, wollastonite, zeolite, diatomaceous earth, silica sand, alumina sol, aluminum hydroxide, aluminum sulphate, barium sulphate, calcium sulphate, lithopone, molybdenum disulphide, rubber power, shellac, cork powder, cellulose powder, and any combination thereof. The EP(D)M compounds can include cumulatively 40 phr to 500 phr, or 40 phr to 150 phr, or 100 phr to 350 phr, or 300 phr to 500 phr of one or more fillers.

Additional additives include, but are not limited to, adhesion promoters, peptizer, blowing agent, blowing promoters, slip agent, internal mould release, antifogging agent, flame retardant, built-in antistatic agent, coloring agent (pigment and dye), coupling agent, antiseptic agent, anti-mildew agent, deodorant, and any combination thereof.

Ethylene Propylene Diene Copolymer Compounds

The EP(D)M compounds described herein comprise 60 phr to 95 phr of a first EP(D)M having an ethylene content of 62 wt % to 90 wt % based on the first EP(D)M; and 5 phr to 40 phr of an second EP(D)M having an ethylene content of 40 wt % to 60 wt % based on the second EP(D)M. For the EP(D)M compounds described herein, the $\Delta H_f$ between the first and second EP(D)Ms can be 5 J/g or greater (e.g., 5 J/g to 80 J/g), or 5 J/g to 15 J/g, or 10 J/g to 25 J/g, or 20 J/g to 60 J/g, or 50 J/g to 80 J/g.

Generally, the EP(D)M components are compounded with additives except the curing agents in a first pass, which is then compounded with the curing agents in a second pass. However, alternative compounding methods known in the art can be used.

Methods and Layered Articles

The EP(D)M compounds once formed may be converted into layers by several techniques. Layered articles are articles having at least a portion of the structure formed by two or more layers. Examples of layered articles include, but are not limited to, belts (e.g., V-belts), tubes, hoses, and roof sheeting.

For example, in the production of V-belts, the rubber is first compounded with small fibers, then formed into a layer over a calendar roll. These fiber-filled layers are then interspersed with cords to form a sheet. This sheet is then cut into strips; each strip is then formed into a complete loop, the ends placed together and the system vulcanized. The incorporation of the second EP(D)M in the EP(D)M compounds has been found to impart sufficient building tack to the EP(D)M compounds to enable it to form bonds of sufficient strength with the other layers and thus enable vulcanization without the need for additional adhesives. That is, in some embodiments, the multilayer structure is absent an adhesive adjacent to the at least one layer comprising the EP(D)M compound.

In another example, a typical roof sheeting calendaring process involves a) producing the EP(D)M compound described herein, b) calendaring, c) curing or vulcanizing. In the calendaring step, the EP(D)M compound is conveyed to the roll mills and then the calendars at about 210° F. to 250° F. (98° C. to 121° C.). The sheets then pass through chill rolls at 40° F. to 60° F. (5° C. to 15° C.) and then pass through a mica dusting area and then wound up on a mandrel. In curing, the mandrel holding the roof sheeting membrane is placed in a steam autoclave and cured for 4 hours to 6 hours at 302° F. to 392° F. (150° C. to 200° C.). Other curing techniques may be used, such as rotocuring, dry air oven aging and the like.

In yet another example, automotive radiator coolant hoses typically comprise an inner tube and an outer cover and a yarn or fiber reinforcement layer between the tube and cover. Steam hoses and some other types of hoses also use reinforcements and/or other layers between the inner tube and the outer cover. The EP(D)M compound can be used to fabricate at least a portion of either of these hoses or similar hose structures. Preferably, the EP(D)M compound is used to produce at least a portion of the inner tube.

The hose may be produced by any conventional method. For example, the unvulcanized EP(D)M compound may be formed into an elongated tube. The tube and reinforcement is then positioned on a mandrel. A cover material may be applied to the outer surface of the tube. Pressure may be applied either directly or by wrapping the hose in a tape fabric, such as a plastic tape, and, thereafter, subjecting the hose to heat and steam pressure to vulcanize the hose.

A typical hose generally comprises an inner tube, an outer cover, and a reinforcement. The inner tube is adapted to contain the fluid or vapor to be conveyed by the hose and to resist the internal pressure of the material being conveyed or the external forces acting on the hose. The cover protects the hose from mechanical and environmental damage.

A preferred method of manufacturing hoses, such as automotive hoses, is the extrusion process. For example, to produce a hose utilizing the EP(D)M compound of the present invention by the extrusion process, the EP(D)M compound is heated in an extruder suitable for extruding rubber. The extruder acts like a pump, thereby forcing the softened rubber mass through a pin and ring die configuration, which causes the composition to take the shape of a tube. The tube is cooled immediately in a water trough. Subsequently, the reinforcement is applied by either spiraling, knitting, or braiding a textile yarn around the tube. Thereafter, the reinforced tube is covered with the EP(D)M compound of the present invention or with a different composition, such as compositions conventionally used in outer tube covers, depending on the desired end usage of the hose, by passing the reinforced tube through a cross-head extruder. The resulting extruded, covered and reinforced tube is cooled again in a water trough, then cut into hose pieces of desired lengths which are placed on preformed mandrels. Thereafter, the hose pieces are vulcanized in a steam autoclave.

For steam hose applications, one or more layers of brass-coated steel wire may be used as a reinforcement.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the embodiments of the present invention. At the very least, and not as an attempt to limit the application of the doctrine of equivalents to the scope of the claim, each numerical parameter should at least be construed in light of the number of reported significant digits and by applying ordinary rounding techniques.

One or more illustrative embodiments incorporating the invention embodiments disclosed herein are presented herein. Not all features of a physical implementation are described or shown in this application for the sake of clarity. It is understood that in the development of a physical embodiment incorporating the embodiments of the present invention, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for those of ordinary skill in the art and having benefit of this disclosure.

While compositions and methods are described herein in terms of "comprising" various components or steps, the compositions and methods can also "consist essentially of" or "consist of" the various components and steps.

To facilitate a better understanding of the embodiments of the present invention, the following examples of preferred or representative embodiments are given. In no way should the following examples be read to limit, or to define, the scope of the invention.

EXAMPLES

Compounds (Table 2) containing VISTALON™ polymers (EP(D)M polymers available from ExxonMobil Chemical Company) (Table 1), carbon black, oil, and curatives were prepared in a 1600 cc Krupp® Mixer. Compounds C1 and C2 are comparative compounds, and compounds S1-S5 are inventive compounds. The compounds contain 10 phr of oil (SUNPAR 2280, available from Sunoco) unless otherwise noted. A conventional mix was adopted for compounding, using a fill factor of 70%. At the start of the mix, polymer, carbon black, and additives were introduced with the rotor speed at 50 rpm. The ram was raised three times during the mixing cycle to accommodate the compounding ingredients. Mixing was continued for 5 minutes at which time the batch was discharged. The temperature of the discharged batch on an average was about 250° F. The curatives (VULCUP 40 KE (crosslinking peroxide, available from Arkema) and DYMALINK 719 (a rubber accelerator, available from Cray Valley) were added to the compound in a second pass using the same internal mixer. The batches formulated with the curatives were cured in an electric press and tested for various physical and mechanical properties (Table 3).

TABLE 1

| Polymer | ML (1 + 4) 125° C. (MU) | $C_2$ (wt %) | ENB (wt %) | $H_f$ (J/g) |
|---|---|---|---|---|
| VISTALON™ 706 | 42 | 65.0 | 0.0 | 20.1 |
| VISTALON™ 2502 | 25 | 50.0 | 4.5 | N.D. |
| VISTALON™ 2504 | 25 | 58.0 | 4.7 | 12.9 |
| VISTALON™ 404 | 28 | 45.0 | 0.0 | 3.8 |
| VISTALON™ 785 | 30 | 49.0 | 0.0 | <1 |

N.D. is not detected, so essentially zero.

TABLE 2

| Sample | C1 | C2 | S1 | S2 | S3 | S4 | S5 |
|---|---|---|---|---|---|---|---|
| VISTALON™ 706 (phr) | 100 | | 80 | 80 | 80 | 80 | 80 |
| VISTALON™ 2502 (phr) | | 100 | 20 | 20 | | | |
| VISTALON™ 2504 (phr) | | | | | 20 | | |
| VISTALON™ 404 (phr) | | | | | | 20 | |
| VISTALON™ 785 (phr) | | | | | | | 20 |
| Carbon black | 60 | 60 | 60 | 60 | 60 | 60 | 60 |
| DYMALINK® 708* | 15 | 15 | 15 | 15 | 15 | 15 | 15 |
| SUNPAR™ 2280 | 10 | 10 | 10 | | 10 | 10 | 10 |
| Zinc oxide | 5.0 | 5.0 | 5.0 | 5.0 | 5.0 | 5.0 | 5.0 |
| Zinc stearate | 2.0 | 2.0 | 2.0 | 2.0 | 2.0 | 2.0 | 2.0 |
| AGERITE RESIN D** | 1.0 | 1.0 | 1.0 | 1.0 | 1.0 | 1.0 | 1.0 |
| VULCUP 40 KE | 5.0 | 5.0 | 5.0 | 5.0 | 5.0 | 5.0 | 5.0 |
| DYMALINK 719 | 0.3 | 0.3 | 0.3 | 0.3 | 0.3 | 0.3 | 0.3 |

*difunctional solid dimethacrylate, available from Cray Valley
**polymerized 1,2-dihydro-2,2,4-trimethylquinoline, available from Vanderbilt Chemicals

TABLE 3

| Sample | C1 | C2 | S1 | S2 | S3 | S4 | S5 |
|---|---|---|---|---|---|---|---|
| Building Tack without aging (g/in) | 24 | 789 | 50 | 56 | 50 | 35 | 30 |
| Building Tack after aging at room temp for 1 month (g/in) | <5 | | 48 | 46 | 38 | 19 | 18 |
| Compounded Mooney viscosity | | | | | | | |
| ASTM D1646 | | | | | | | |
| ML (1 + 4) at 125° C. (MU), | 74 | 48 | 68 | 94 | 70 | 79 | 71 |
| MDR at 180° C. and 0.5 deg Arc | | | | | | | |
| ASTM D5289 | | | | | | | |
| ML (dN•M) | 2.3 | 1.8 | 2.1 | 3.1 | 2.1 | 2.2 | 2.0 |
| MH (dN•M) | 33.2 | 32.4 | 29.6 | 47.5 | 33.2 | 27.0 | 30.0 |
| MH–ML (dN•M) | 30.9 | 30.6 | 29.6 | 44.4 | 31.0 | 24.8 | 28.0 |
| ts2 (min) | 0.5 | 0.5 | 0.5 | 0.5 | 0.5 | 0.5 | 0.5 |
| t50 (min) | 1.3 | | 1.4 | 1.5 | 1.4 | 1.3 | 1.3 |
| t90 (min) | 4.0 | 3.6 | 4.6 | 4.9 | 4.5 | 4.3 | 4.3 |
| Peak rate (dN•M/min) | 28.3 | 20.5 | 22.6 | 32.9 | 24.5 | 25.0 | 27.2 |
| Press cure for 30 minutes at 180° C. | | | | | | | |
| ASTM D412 | | | | | | | |
| Hardness (Shore A) | 74 | | 74 | 81 | 74 | 73 | 73 |
| Stress at 100% strain (MPa) | 4.6 | 6.7 | 5.0 | 9.2 | 5.2 | 4.6 | 4.5 |
| Stress at 200% strain (MPa) | 11.9 | 17.0 | 13.0 | | 13.4 | 12.1 | 11.8 |
| Stress at 300% strain (MPa) | 19.5 | | 21.1 | | | 20.3 | 19.7 |
| Tensile strength (MPa) | 20.2 | 20.1 | 21.5 | 20.5 | 18.7 | 22.1 | 18.3 |
| Elongation (%) | 306 | 229 | 310 | 183 | 266 | 329 | 284 |

TABLE 3-continued

| Sample | C1 | C2 | S1 | S2 | S3 | S4 | S5 |
|---|---|---|---|---|---|---|---|
| Green tensile properties | | | | | | | |
| ASTM D412 | | | | | | | |
| Stress at 10% strain (MPa) | 0.61 | 0.47 | 0.65 | 0.79 | 0.64 | 0.52 | 0.56 |
| Stress at 25% strain (MPa) | 0.83 | 0.55 | 0.81 | 0.97 | 0.78 | 0.62 | 0.74 |
| Stress at 100% strain (MPa) | 0.86 | | 0.78 | 0.97 | 0.79 | 0.61 | 0.76 |
| Aged for 7 days at 150° C. | | | | | | | |
| ASTM D412 | | | | | | | |
| Tensile strength | 18.8 | 15.9 | 19.5 | 20.9 | 20.0 | 18.0 | 19.8 |
| Elongation | 328 | 163 | 325 | 211 | 316 | 277 | 361 |
| Tensile retained | 93 | 79 | 91 | 102 | 107 | 81 | 108 |
| Elongation retained | 107 | 71 | 105 | 115 | 119 | 84 | 127 |

The reference formulation containing VISTALON™ 706 (compound C1) has a tack value of 24 gm/inch, while the formulation containing VISTALON™ 2502 as the only polymer component (compound C2) has a tack value of 790 gm/inch. Addition of VISTALON™ 2502 at 20 phr level (compound S1) enhances tack of compound C1 from 24 gm/inch to 50 gm/inch as seen in Table 3. Similarly, addition of VISTALON™ 2504 at 20 phr level (compound S3) enhances tack by a factor of two to 50 gm force/inch. The build tack is also higher in both the formulations containing VISTALON™ 404 (compound S4) and VISTALON™ 785 (compound S5) as the additive polymer. When oil was excluded from compound S1, compound S2 has a comparable tack value. Also, the building tack without aging is higher in compounds S1, S2, and S3, which include second EP(D)M with ENB, as compared to compounds S4 and S5 that include second EP(D)M without a diene component.

The compounds tested for build tack were aged for over 30 days at ambient conditions, and then re-tested using the same procedure. Table 3 also shows the aged tack data of the various formulations. The formulation containing VISTALON™ 2502 (compound S2) virtually retains its original tack value after ageing. All the formulations containing the second EP(D)M as the additive (compounds S1-S5) display higher aged tack value in comparison to the reference VISTALON™ 706 compound (compound C1). The better retention of tack from the compounds with second EP(D)M than the compound C1 is desirable for shelf life of green compounds that may be needed in belt manufacturing.

Table 3 also shows the compound cure, mechanical, and green strength properties. Compound C1 is formulated with VISTALON™ 706, while compound C2 is formulated with VISTALON™ 2502. The peak cure rate marginally decreases with the addition of the second EP(D)M polymers in compounds S1, S3, S4 and S5. However, the cure rate is higher compared to the compound C2. Cure state of compounds S1 and S3 containing second EP(D)M with ENB are comparable to that of compounds C1 and C2 but higher than that of compounds S4 and S5 containing EP copolymers without ENB.

The compound elongation to break in compounds S1, S3, S4, and S5 is greater than 250%; while for the compound C2 the elongation to break is 229%. Tensile strength of compounds S1, S3, S4, and S5 is comparable to compounds C1 and C2. After aging at 150° C. from 7 days, elongation values of compounds S1, S3, S4, and S5 are significantly higher compared to compound C2. The elongation values are greater than 275% in the inventive compounds compared to 163% for compound C2 containing VISTALON™ 2502 polymer. Tensile strength of compounds S1, S3, S4, and S5 after aging was comparable to that of compound C1 (≥18.0 MPa) but higher than that of compound C2 (15.9 MPa).

The compound green strength is represented by tensile stress at 25% elongation of the uncured compound. The green strength of the formulation containing VISTALON™ 2502 as the additive (compound S1) is close to the reference compound. This formulation has the best combination of build tack and green strength compared to both control compounds C1 and C2, respectively. The formulation containing VISTALON™ 2502 (compound C2) has substantially lower green strength (0.55 MPa), in comparison to the inventive formulations. The addition of the second EP(D)M polymer enhances tack and preserves green strength; both properties are important for the end use application. Compound Mooney of compounds S1, S3, S4, and S5 is comparable to compound C1 but higher than compound C2 due to the softer VISTALON™ 2502 polymer.

Upon removal of oil from compound S1, compound S2 shows higher cure rate and cure state than compound S1. Compound S2 has lower elongation than compound S1 but comparable tensile strength, both of which are retained after aging at 150° C. for 7 days. Compound S2's green strength and compound Mooney are higher than those of compound S1.

Further, compound S3 has a higher green strength but comparable build tack as compared to compound S2, which can be advantageous in layered article applications.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

The invention claimed is:

1. An article comprising:
a multilayer structure with at least one layer comprising an ethylene propylene diene copolymer compound that comprises:
60 parts per hundred rubber (phr) to 95 phr of a first ethylene propylene diene copolymer having an ethylene content of 62 wt % to 90 wt % based on the first ethylene propylene diene copolymer and a heat of fusion ($H_f$) of 15 J/g or greater;
5 phr to 40 phr of a second ethylene propylene diene copolymer having an ethylene content of 40 wt % to 60 wt % based on the second ethylene propylene diene copolymer and a heat of fusion ($H_f$) of 0 J/g;
wherein the first ethylene propylene diene copolymer and second ethylene propylene diene copolymer combined are 100 parts;
a filler at 40 phr to 500 phr; and
a curing agent at 0.5 phr to 20 phr.

2. The article of claim 1, wherein the ethylene propylene diene copolymer compound has at least one of the following three properties:
(i) greater than 20% increase in a building tack without aging as compared to a control compound that is identical to the ethylene propylene diene copolymer compound except 0 phr of the second ethylene propylene diene copolymer and 100 phr of the first ethylene propylene diene copolymer,
(ii) greater than 50% retention in a building tack with aging at ambient condition for 1 month, and
(iii) not more than 30% decrease in a green strength as compared to the control compound.

3. The article of claim 1, wherein the first ethylene propylene diene copolymer comprises units derived from ethylene, propylene, and a diene, wherein a diene content is 0.1 wt % to 6 wt % based on the first ethylene propylene diene copolymer.

4. The article of claim 1, wherein the second ethylene propylene diene copolymer comprises units derived from ethylene, propylene, and a diene, wherein a diene content is 0.1 wt % to 6 wt % based on the second ethylene propylene diene copolymer.

5. The article of claim 1, wherein the ethylene propylene diene copolymer compound is absent processing oil.

6. The article of one of claim 1, wherein the ethylene propylene diene copolymer compound further comprises 0.1 phr to 30 phr processing oil.

7. The article of claim 1, wherein the ethylene propylene diene copolymer compound further comprises an antioxidant at 0.1 phr to 20 phr.

8. The article of claim 1, wherein the ethylene propylene diene copolymer compound further comprises a softener at 0.1 phr to 20 phr.

9. The article of claim 1, wherein the article is a belt, a tube, a hose, or a roof sheeting.

10. The article of claim 1, wherein the multilayer structure is absent an adhesive adjacent to the at least one layer comprising the ethylene propylene diene copolymer compound.

11. A method comprising:
forming an ethylene propylene diene copolymer compound comprising:
60 parts per hundred rubber (phr) to 95 phr of a first ethylene propylene diene copolymer having an ethylene content of 62 wt % to 90 wt % based on the first ethylene propylene diene copolymer and a heat of fusion ($H_f$) of 15 J/g or greater;
5 phr to 40 phr of a second ethylene propylene diene copolymer having an ethylene content of 40 wt % to 60 wt % based on the second ethylene propylene diene copolymer and a heat of fusion ($H_f$) of 0 J/g
a filler at 40 phr to 100 phr; and
a curing agent at 0.5 phr to 20 phr;
forming a multilayer structure comprising at least one layer comprising the ethylene propylene diene copolymer compound; and
vulcanizing the multilayer structure.

12. The method of claim 11, wherein the ethylene propylene diene copolymer compound has at least one of the following three properties:
(i) greater than 20% increase in a building tack without aging as compared to a control compound that is identical to the ethylene propylene diene copolymer compound except 0 phr of the second ethylene propylene diene copolymer and 100 phr of the first ethylene propylene diene copolymer,
(ii) greater than 50% retention in a building tack with aging at ambient condition for 1 month, and
(iii) not more than 30% decrease in a green strength as compared to the control compound.

13. The method of claim 11, wherein the first ethylene propylene diene copolymer comprises units derived from ethylene, propylene, and a diene, wherein a diene content is 0.1 wt % to 6 wt % based on the first ethylene propylene diene copolymer.

14. The method of claim 11, wherein the second ethylene propylene diene copolymer comprises units derived from ethylene, propylene, and a diene, wherein a diene content is 0.1 wt % to 6 wt % based on the second ethylene propylene diene copolymer.

15. The method of claim 11, wherein the ethylene propylene diene copolymer compound is absent processing oil.

16. The method of claim 11, wherein the ethylene propylene diene copolymer compound further comprises 0.1 phr to 30 phr processing oil.

17. The method of claim 11, wherein the ethylene propylene diene copolymer compound further comprises an antioxidant at 0.1 phr to 20 phr.

18. The method of claim 11, wherein the ethylene propylene diene copolymer compound further comprises a softener at 0.1 phr to 20 phr.

19. The method of claim 11, wherein the article is a V-belt.

20. The method of claim 11, wherein the multilayer structure is absent an adhesive adjacent to the at least one layer comprising the ethylene propylene diene copolymer compound.

* * * * *